United States Patent [19]

Fujita et al.

[11] Patent Number: 5,009,696
[45] Date of Patent: Apr. 23, 1991

[54] FERTILIZER WITH A DEGRADATIVE COATING

[75] Inventors: Toshio Fujita; Yoshisato Yamashita; Shigemitsu Yoshida; Katsutoshi Yamahira, all of Minamatashi, Japan

[73] Assignee: Chisso Corporation, Osaka, Japan

[21] Appl. No.: 285,617

[22] Filed: Dec. 16, 1988

Related U.S. Application Data

[63] Continuation of Ser. No. 64,577, Jun. 22, 1987, abandoned.

[30] Foreign Application Priority Data

Jul. 7, 1986 [JP] Japan .................. 61-159149
Aug. 7, 1986 [JP] Japan .................. 61-160126

[51] Int. Cl.$^5$ ................ C05G 3/00; C05G 3/10
[52] U.S. Cl. .................... 71/64.07; 71/64.11; 71/64.12; 521/185
[58] Field of Search ............ 71/64.07, 64.11, 64.12; 521/185; 524/417, 114

[56] References Cited

U.S. PATENT DOCUMENTS 3,780,140 12/1973 Hammer ..................... 525/185

FOREIGN PATENT DOCUMENTS 0098265 8/1978 Japan ................... 71/64.07
0147538 9/1982 Japan ................... 525/185
0045188 3/1983 Japan ................... 71/64.07

Primary Examiner—Ferris H. Lander
Attorney, Agent, or Firm—Fred Philpitt

[57] ABSTRACT

A fertilizer with a degradative coating wherein the dissolving-out rate of the fertilizer component can be controlled by adjusting the composition of the coating component and the residual capsule after the dissolving out degrades by light is provided, which degradative coating comprises as its active ingredient, at least one member of polyolefin resins and at least one member selected from the group consisting of rubbery resins and ethylene-vinyl acetate-carbon monoxide copolymer.

20 Claims, 1 Drawing Sheet

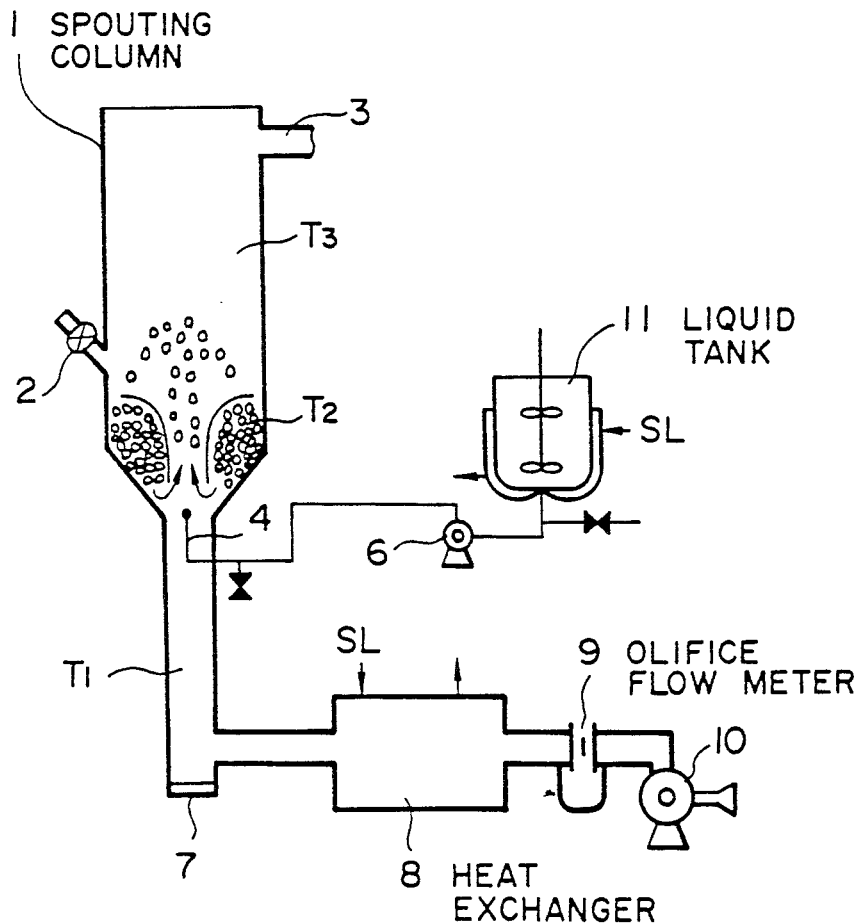

FERTILIZER WITH A DEGRADATIVE COATING

This is a continuation of application Ser. No. 64,577, filed June 22, 1987 and now abandoned, and the benefits of 35 USC 120 are claimed relative to it.

BACKGOUND OF THE INVENTION

1. Field of the Invention

This invention relates to a fertilizer with a degradative coating, and more particularly it relates to a fertilizer encapsulated with a polyolefin resin and a rubbery resin or an ethylene-vinyl acetate-carbon monoxide copolymer as an active ingredient.

The fertilizer of the present invention is characterized in that by adjusting the composition of the coating component, it is possible to control the disolving-out rate of the fertilizer component and the residual capsule after dissolving-out of the fertilizer component degrades by light.

2. Description of the Related Art

In recent years, coated granular fertilizers obtained by encapsulating i.e. coating granular fertilizers to adjust the dissolving-out rate of fertilizer component have been developed and gradually come to be practically used.

Coated granular fertilizers include those of the following two types:

those obtained by thickly coating granular fertilizers with sulfur, wax or low molecular polyolefins and those obtained by thinly coating them with high molecular materials. However, the latters are superior in the aspect of the adjustability of the dissolving-out rate and the functional properties such as resistance to damage of the coating at the time of handling, etc. On the other hand, the latters have raised such problems that as to the production process, the coating step wherein the high molecular materials are used is technically very difficult, and when they are used, the degradative decomposition of the residual capsule (coating) after dissolving-out of the fertilizer component requires a long time.

As to the above-mentioned problems, the present inventors have so far made and disclosed various inventions directed to a process for producing a coated granular fertilizer using a high molecular material such as polyolefin resins as well as a process for adjusting the dissolving-out rate of the fertilizer. For example, Japanese patent publication No. Sho 60-21,952/1985 discloses a technique of obtaining a coated granular fertilizer having a high reproducibility of adjusting the dissolving-out rate, by coating fertilizers with a coating material obtained by blending a polyolefin resin with ethylene-vinyl acetate copolymer, and Japanese patent publication No. Sho 60-37,074/1985 also discloses the above-mentioned technique by coating fertilizers with a material obtained by further adding a surfactant to the above-mentioned coating material.

Further, Japanese patent publication No. Sho 60-3,040/1985 and Japanese patent application laid-open No. Sho 55-1,672/1980 also disclose a technique wherein a granular fertilizer is coated with a material obtained by blending and dispersing an inorganic powder such as talc and sulfur in the above-mentioned coating material to thereby impart degradativity to the capsule i.e. the coating after dissolving out the fertilizer component while keeping the function of adjusting the dissolving-out rate.

However, it cannot yet be said that the dissolving-out properties of the fertilizer component and the degradativity of the coating of the above-mentioned known coated granular fertilizers are sufficient in the aspect of functions of adjusting these properties.

SUMMARY OF THE INVENTION

In view of the above-mentioned problems of the prior art, the present inventors have made extensive research in order to find a fertilizer with a degradative coating being superior in both the function of adjusting the dissolving-out rate of the fertilizer component and the function of adjusting the degrading rate of the coating after the dissolving-out, and as a result have found that when a polyolefin resin and a rubbery resin or an ethylene-vinyl acetate-carbon monoxide copolymer are simultaneously used as an active ingredient, it is possible to solve the above-mentioned problems.

As apparent from the foregoing, the object of the present invention is to provide a fertilizer with a degradative coating having a high adjustability in both the dissolving-out properties of the fertilizer component and the degradativity of the remaining coating (capsule) after the dissolving-out.

The present invention resides in the following main constitution (1) and the following constitutions (2) to (6) as its embodiments:

(1) A fertilizer with a degradative coating comprising as its active ingredient, at least one member of polyolefin resins and at least one member selected from the group consisting of rubbery resins and ethylenevinyl acetate-carbon monoxide copolymer.

(2) A fertilizer according to item (1) wherein said polyolefin resins are at least one member selected from the group consisting of polyethylene, polypropylene, polybutene-1 and copolymers of at least one member selected from the group consisting of ethylene, propyrene and butene-1 and said rubbery resins are at least one member selected from the group consisting of natural rubber, polyisoprene, polybutadiene, styrenebutadiene copolymer and styrene-isoprene copolymer.

(3) A fertilizer according to item (1) wherein the ratio by weight of said rubbery resins to said polyolefin resins is in the range of 0.1 to 1.5.

(4) A fertilizer according to item (1) wherein the ratio by weight of said ethylene-vinyl acetate-carbon monoxide copolymer to said polyolefin resins is in the range of 0.1 to 1.8.

(5) A fertilizer according to item (1) wherein said coating further has a water-difficulty soluble or water-insoluble filler mixed therein.

(6) A fertilizer according to item (5) wherein said filler is at least one member selected from the group consisting of talc, clay, diatomaceous earth, silica, metal silicates, calcium carbonate, sulfur, metal oxides and starch, each in powder form.

BRIEF DESCRIPTION OF THE DRAWING

FIG. 1 shows the flow sheet of a spouting coating apparatus employed in Examples of the present invention.

DETAILED DESCRIPTION OF PREFERRED EMBODIMENTS

The constitution and effectiveness of the present invention will be described below in more detail.

The coating of the encapsulated granular fertilizer comprises as its active ingredient, polyolefin resins and rubbery resins or/and ethylene-vinyl acetate-carbon monoxide copolymer (referred to often as $C_2H_4$-VAc-CO copolymer).

The polyolefin resins are the same as known ones such as polyethylene (low, medium and high density products), polypropylene (including various kinds of block or random copolymers), polybutene (including its copolymers), etc. and their melt flow rates are also in the same range as those of polyolefin resins for producing various kinds of molded products (e.g. 0.1 to 50).

The rubbery resins are the same as known ones and examples thereof are raw rubbers prior to vulcanization such as natural rubber, polyisoprene rubber, polybutadiene rubber, styrene-butadiene rubber, etc. and further, thermoplastic rubbery elastomers such as 1,2-syndiotactic polybutadiene, styrene-butadiene block copolymer, styrene-isoprene block copolymer, etc.

The ethylene-vinyl acetate-carbon monoxide copolymer used in the present invention is a product obtained by copolymerizing the respective constituting monomers, and its preferred inner composition is as follows: 5 to 50% by weight of vinyl acetate, 0.1 to 15% by weight of carbon monoxide and 35 to 94.9% by weight of ethylene. Among these constituents, vinyl acetate contributes to properties of adjusting the dissolving-out of the fertilizer component from the coating of the fertilizer of the present invention and there is a tendency that the higher its content, the more promoted the dissolving-out of the fertilizer component. However, if the content of vinyl acetate is less than 5% by weight, the substantial effectiveness of promoting the dissolving-out is poor, while if it exceeds 50% by weight, only dissolving-out properties to the same extent as that of copolymer of 50% by weight thereof are exhibited; hence choice of copolymer of such a composition is poor in the meaning. Further, among the above constituents, carbon monoxide has an influence upon the degradativity of the coating of the fertilizer of the present invention, and the higher its content, the higher the degradativity. However, if its content is less than 0.1% by weight, the degradativity is insufficient, while if it exceeds 15% by weight, the degradativity of the coating is too high; hence necessity of copolymer of such a high content is poor except for particular cases.

Next, as to the preferred respective proportions of the polyolefin resins and the rubbery resins as the indispensable constituents for the coating of the fertilizer of the present invention, if the molding materials of the coating are composed only of these two kinds of the resins, the ratio by weight of rubbery resins/polyolefin resins is in the range of 0.1 to 1.5. If the ratio is less than 0.1, the degradativity of the coating is insufficient, while if it exceeds 1.5, the coating becomes adhesive so that the resulting coated fertilizer particles are liable to cause blocking with each other to make their handling difficult.

On the other hand, as to the preferred respective proportions of the polyolefin resins and the $C_2H_4$-VAc-CO copolymer as the indispensable constituents for the coating of the fertilizer of the present invention, if the molding materials of the coating are composed only of these two kinds of the resins, the ratio by weight of $C_2H_4$-VAc-CO copolymer/polyolefin resins is in the range of 0.1 to 1.8. If the ratio is less than 0.1, the degradativity of the coating is insufficient, while if it exceeds 1.8, the coating becomes adhesive so that there occurs an undesirable tendency that when the coated granular fertilizer is produced or when the resulting particles are heaped up at high temperatures, the particles adhere to each other. However, such an undesirable tendency can be alleviated and relieved by blending a filler with such a coating composition of the present invention.

As to the constituents of the coating composition used in the coated granular fertilizer of the present invention, it is possible to blend therein a considerable quantity of water-difficultly soluble or water-insoluble fillers in addition to the above-mentioned two kinds of indispensable coating constituents. When the mixing proportion of such fillers in the above-mentioned coating composition is increased, the dissolving-out properties of the fertilizer component out of the resulting coating are enhanced; hence it is possible to replace a portion of the above-mentioned rubbery resins or $C_2H_4$-VAc-CO copolymer by the fillers as an agent for adjusting the dissolving-out rate. However, use of such fillers may often reduces the strength of the coating and causes damage to the coating of the fertilizer at the time of storage, transportation and scattering of the coated granular fertilizer to thereby lose the aimed function of adjusting the dissolving-out of the fertilizer component; hence the kind, blending method and blending proportion of the fillers are restricted. Further, use of the fillers also has a merit that the residual capsule i.e. coating after use of the coated granular fertilizer is liable to degrade due to the above-mentioned reduction in the coating strength. Thus, blending of the fillers with the coating composition of the present invention is determined taking the above-mentioned various conditions into account.

In the present invention, however, when the resistance to damage of the coating becomes a decisive factor and its safety from the damage is taken into account, the blending proportion of the fillers in the coating composition for general-purpose fertilizers is preferred to be 80% by weight or less.

When the fillers are blended with the coating composition of the present invention, it is necessary that the particle diameter of the fillers be ½ or less, preferably ¼ less the thickness of the coating to be later formed on the surface of the granular fertilizer and the fillers be uniformly dispersed in the composition (hence in the coating). If the particle diameter is larger than ½ the coating thickness, the coating is liable to be damaged, and this applies also to the case where the dispersion is non-uniform.

Preferred kinds of the fillers have no particular limitation, but taking economy and dispersibility into account, examples thereof are talc, clay, diatomaceous earth, silica, metal silicates, calcium carbonate, sulfur, metal oxides, starch, etc.

In the coated granular fertilizer of the present invention, the components and blending proportions of the coating composition are determined taking into account the coating strength at the time of handling of the fertilizer, the dissolving-out rate of the fertilizer component at the time of its use, the degradativity of the coating, etc.

To this composition may be added other known additives such as surfactant in addition to the above-mentioned respective components to thereby modify the coating of the present invention (promotion of the dissolving-out of the fertilizer component, impartion of hydrophilic nature, prevention of floating, etc.).

In order to concretely design the coated granular fertilizer of the present invention as a whole, the following items are taken into account:

1 choice of the granular fertilizer (kind, particle diameter, form, etc.);

2 the using manner of the fertilizer (for example, whether or not the coated granular fertilizer alone is stored, transported or scattered); and 3 the dissolving-out duration of the fertilizer component and the degradation duration of the coating to be expected.

Further, at the time of the design, other known coating treatment techniques such as addition of a surfactant, hydrophilic nature-imparting treatment, etc. may be additionally applied.

The kind of the above-mentioned granular fertilizer 1 has no particular limitation. Namely chemical fertilizers such as ammonium sulfate, ammonium chloride, ammonium nitrate, urea, potassium chloride, potassium sulfate, potassium nitrate, sodium nitrate, ammonium phosphate, potassium phosphate, calcium phosphate and composite fertilizers composed of two or more kinds of the foregoing are known.

The capsule (coating) of the fertilizer using the rubbery resins of the present invention is degraded mainly by the action of light within a short period after scattering of the fertilizer and the resulting material constitutes a portion of soil. It is known that in general, rubber or rubbery resins are liable to easily deteriorate by light; however, since the coating of the fertilizer of the present invention contains rubbery resins together with polyolefin resins, it is presumed that deterioration of polyolefin resin portion is also promoted to accelerate the degradation of the capsule.

As to the fertilizer of the present invention, deterioration of the capsule may proceed during its use or storage to damage the aimed function (successive dissolving-out properties of the fertilizer component). Such a problem, however, can be solved by blending a suitable quantity of a known ultraviolet absorber or antioxidant with the coating composition of the present invention. However, the compatibility of such an ultraviolet absorber or antioxidant used at that time with the base resin (polyolefin resins or rubbery resins) is preferred to be not good so much. Because such an agent having a good compatibility remains in the residual coating after use of the fertilizer of the present invention for a long time to hinder the degradativity of the coating, whereas the agent having an inferior compatibility successively bleeds onto the surface of the coating so that it will not be contained in the residual coating.

The coating using the $C_2H_4$-VAc-CO copolymer in the fertilizer of the present invention, after scattering of the fertilizer, is subjected to deteriorative decomposition by light and oxygen into degradation. The deteriorative decomposition is notable particularly on the surface of soil and the coating degrades as it is and besides degrades by operations of cultivation or the like and ultimately it is decomposed by microorganisms. The coating may deteriorate prior to scattering of the fertilizer on soil depending on the storage conditions. In such a case, a known ultraviolet absorber or stabilizer e.g. antioxidant is used to impart a suitable stability to the coating. However, such a stability is preferred to be effected by the use of such a stabilizer that taking the above-mentioned storage period into account, the stabilizer bleeds onto the surface of the coating and is removed therefrom after lapse of the period to lose its stabilizing effect.

The process for producing the coated granular fertilizer of the present invention i.e. the process for coating granular fertilizers may be carried out in the same manner as that disclosed in the above-mentioned known process (Japanese patent publication Nos. Sho 50-99,858 and Sho 60-37,074). According to the process, an organic solvent solution of the above-mentioned coating composition is sprayed onto a granular fertilizer in the state of rolling or fluidization by a spraying means to coat the surface of the fertilizer, while the resulting coated material is at the same time treated by a high speed hot air stream to instantaneously vaporize the organic solvent on the surface of the coated material for drying. For the fluidization of the granular fertilizer in this case, it is most preferred to employ a spouting layer. In this case, a known process found by the present inventors (Japanese patent publication No. Sho 60-102) may also be employed wherein a portion or the total of powder in the coating material of the present invention is mixed with and dispersed in a spouting hot air to carry out the above-mentioned coating operation, whereby the powder is dispersed in the coating to be formed on the surface of the granular fertilizer. Such a process is suitable to a case where powder which is difficult to be uniformly dispersed in the organic solvent solution of the coating material composition is used.

The present invention will be described in more detail by way of Examples.

EXAMPLE

I. Production example of the fertilizer of the present invention:

FIG. 1 shows a spouting encapsulating apparatus employed in this Example. Numeral 1 shows a spouting column having a column diameter of 250 mm, a height of 200 mm, an air-spouting diameter of 50 mm and a conical angle of 50° and provided with a fertilizer-feeding port 2 and an exhaust gas-discharging port 3. Air through a spouting port is sent from a blower 10 via an orifice flowmeter 9 and a heat-exchanger 8 to the spouting column. The flow quantity is controlled by the flowmeter, the temperature is controlled by the heat-exchanger and the exhaust gas is discharged through the discharging port 3 to the outside of the column. The granular fertilizer used in the encapsulation treatment is fed through the fertilizer-feeding port 2 while a definite quantity of hot air is passed to form a spout. The hot air temperature is detected by a thermometer $T_1$, the particle temperature during encapsulation, by a thermometer $T_2$ and the exhaust gas temperature, by a thermometer $T_3$. When the $T_3$ temperature has reached a definite temperature, an encapsulating liquid is blown through a single-fluid-nozzle 4 toward the spout in the form of spray. The encapsulating liquid is agitated in a liquid tank 11 and when powder is used, the powder is uniformly dispersed also therein. Such liquid or liquid and powder are sent from the tank by way of a pump 6, and the pipe led to the nozzle 4 is made a double pipe through the outer space of which steam is passed so that the temperature cannot be lowered down to 100° C. or less. When the percentage encapsulation has reached a definite one, the blower is stopped and the encapsulated fertilizer is withdrawn from a withdrawing port.

In this Example, the encapsulation was carried out under the following conditions:

Single-fluid-nozzle: opening 0.8 mm, full cone type

Quantity of hot air: 4 m$^3$/min.
Temperature of hot air: 100° C.±2° C.
Kind of fertilizer: granular urea of 5 to 8 meshes
Quantity of fertilizer at its feeding port: 10 Kg/batch
Concentration of encapsulating liquid: solids content 2.5% by weight
Quantity of encapsulating liquid fed: 0.5 Kg/min.
Encapsulation time: 40 minutes
Percentage encapsulation (relative to fertilizer): 5.0%

In order to evidence the dissolving-out control and capsule degradativity of the fertilizer of the present invention, samples shown in Table 1 and Table 2 were prepared. Further, for comparison, samples using polyethylene, ethylene-vinyl acetate copolymer, etc. were prepared and shown therein.

II. Example of measurement of percentage dissolving-out of the fertilizer of the present invention:

Each (10 g) of the fertilizers of the present invention prepared in the above item (I) is immersed in water (200 ml) and allowed to stand still at 25° C. After a definite period, it is separated from water and urea dissolved out into water is sought by quantitative analysis. To the resulting fertilizer is added fresh water (200 ml), followed by again allowing it to still stand at 25° C. and seeking urea dissolved out into water by quantitative analysis. Such a procedure is repeated and there is graphed the relationship between the cumulative total of the percentage dissolving-out of urea dissolved out into water and the number of days which lapsed during the repetition, to prepare a dissolving-out rate curve, whereby it is possible to determine the number of days reaching a percentage dissolving-out of 80%.

The percentage dissolving-out into water after 24 hours in the item of dissolving-out of Table 1 and Table 2 refers to a percentage dissolving-out into water after 24 hours at 25° C., and the number of days of 80% dissolving-out was sought by preparing the dissolving-out rate curve in the measurement of the percentage dissolving-out.

It is seen that any of the product of the present invention has a low percentage dissolving-out after 24 hours and is well encapsulated. Further it is also seen that the number of days of 80% dissolving-out can be controlled by the ratio of the polyolefin to the rubbery resin or $C_2H_4$-VAc-CO copolymer and also by the blending proportion of powder.

III. Example of measurement of capsule degradativity

Each (5 g) of the fertilizers prepared in the item (I) was subjected to preparation of a pinhole each granule with a needle, followed by allowing the resulting granules to stand still in water, whereby the inside urea is completely dissolved out to prepare hollow capsules, which are then dried to prepare samples to be tested.

Dried sand of 12 meshes-pass is placed in a square box of polyvinyl chloride of 15 cm long, 15 cm wide and 15 cm high so as to be almost full of the sand, followed by arranging the purified hollow capsules on the surface of the sand, fitting a quartz sheet of 2 mm thick onto the box so as to prevent rain, allowing the resulting box to stand outdoors over six months (since April till September), thereafter placing the total quantity of the sand and the capsules in a V type mixer provided with rotating blades, mixing them with stirring for 30 minutes, thereafter separating the capsules from the sand with a sieve of 10 meshes and seeking the percentage of 10 meshes-on capsules relative to the sample capsules. This percentage is referred to as degree of degradation and shown in Table 1 and Table 2.

TABLE 1

| Run No. | Encapsulating material (g) | | | | Dissolving-out | | Degree of degradation % |
|---|---|---|---|---|---|---|---|
| | Resin A | Resin B | | Powder | Percentage dissolving-out into water after 24 hours % | Number of days of 80% dissolving-out day | |
| 1 | RE500*[1] | Rubber-1*[2] | 0 | Talc*[3] | 0 | 0.1> | 850 | 3 |
| 2 | RE200 | Rubber-1 | 300 | | 0 | 0.1 | 63 | 95 |
| 3 | RE300 | Rubber-1 | 200 | | 0 | 0.2 | 184 | 89 |
| 4 | RE450 | Rubber-1 | 50 | | 0 | 0.1> | 630 | 61 |
| 5 | RE250 | Rubber-1 | 0 | | 250 | 0.2 | 170 | 5 |
| 6 | RE100 | Rubber-1 | 150 | | 250 | 0.2 | 29 | 98 |
| 7 | RE150 | Rubber-1 | 100 | | 250 | 0.1 | 68 | 96 |
| 8 | RE225 | Rubber-1 | 25 | | 250 | 0.1 | 132 | 91 |
| 9 | RE150 | Rubber-1 | 0 | | 350 | 0.5 | 71 | 7 |
| 10 | RE125 | Rubber-1 | 25 | | 350 | 0.8 | 62 | 97 |
| 11 | RE75 | Rubber-1 | 75 | | 350 | 0.9 | 26 | 98 |
| 12 | RE100 | Rubber-1 | 0 | | 400 | 13 | 10 | 92 |
| 13 | RE50 | Rubber-1 | 50 | | 400 | 27 | 3 | 98 |
| 14 | PP150*[4] | Rubber-2*[5] | 0 | | 350 | 1.9 | 90 | 15 |
| 15 | PP75 | Rubber-2 | 75 | | 350 | 1.4 | 34 | 98 |
| 16 | RE150*[1] | Rubber-3*[6] | 100 | Talc | 250 | 0.1 | 83 | 94 |
| 17 | RE150 | Rubber-3 | 100 | CaC $O_3$ | 250 | 0.5 | 58 | 95 |
| 18 | RE150 | Rubber-3 | 100 | White Carbon | 250 | 0.2 | 79 | 93 |
| 19 | RE150 | Rubber-3 | 100 | Clay | 250 | 1.8 | 43 | 99 |
| 20 | RE150 | Rubber-3 | 100 | Starch | 250 | 4.5 | 15 | 100 |
| 21 | RE150 | Rubber-3 | 100 | $TiO_2$ | 250 | 0.6 | 78 | 97 |

TABLE 1-continued

| Run No. | Encapsulating material (g) | | | | | Dissolving-out Percentage dissolving-out into water after 24 hours % | Number of days of 80% dissolving-out day | Degree of degradation % |
|---|---|---|---|---|---|---|---|---|
| | Resin A | Resin B | | Powder | | | | |
| 22 | PP150 | EVA*7 | 100 | Talc | 250 | 0.9 | 100 | 1 |

Note:
*1RE: polyethylene: MI = 20, d = 0.918
*2Rubber-1: styrene-isoprene block copolymer styrene/isoprene = 14/88, MI = 9, d = 0.92
*3Talc: average diameter of powder 10μ
*4PP: polypropylene: MI = 20, d = 0.89, homopolymer
*5Rubber-2: polybutadiene rubber
*6Rubber3: styrene-butadiene block copolymer styrene/butadiene = 17/83, MI = 0.3, d = 0.93
CaC O3: calcium carbonate 3μ (average)
White carbon: 0.1μ (average)
Clay: 5μ (average)
Starch: silicon-coated product 18μ (average)
TiO2: 0.5μ (average)
*7EVA: ethylene-vinyl acetate copolymer EVA 25%, MI = 2

TABLE 2

| No. | Encapsulating material (g) | | | | | Dissolving-out Percentage dissolving-out into water after 24 hours % | Number of days of 80% dissolving-out day | Degree of degradation |
|---|---|---|---|---|---|---|---|---|
| | Resin A | Resin B | | Filler | | | | |
| example | | | | | | | | |
| 1 | RE250*1 | EVC1*2 | 250 | | 0 | 0.1 | 130 | 92 |
| 2 | RE400 | EVC1 | 100 | | 0 | 0.1 or lower | 380 | 86 |
| 3 | RE100 | EVC1 | 100 | Talc*3 | 300 | 0.5 | 53 | 98 |
| 4 | RE150 | EVC1 | 50 | Talc*4 | 300 | 0.1 | 125 | 95 |
| 5 | RE100 | EVC1 | 100 | CaCO3 | 300 | 1.9 | 51 | 99 |
| 6 | RE100 | EVC2*5 | 100 | Talc | 300 | 0.3 | 67 | 93 |
| 7 | RE80 | EVC2 | 120 | Talc | 300 | 1.8 | 23 | 99 |
| comp. example | | | | | | | | |
| 1 | RE250 | EVA*6 | 250 | | 0 | 0.1 | 115 | 1 or lower |
| 2 | RE400 | EVA | 100 | | 0 | 0.1 | 349 | " |
| 3 | RE100 | EVA | 100 | Talc | 300 | 0.4 | 47 | 2 |
| 4 | RE150 | EVA | 50 | Talc | 300 | 0.3 | 119 | 3 |

Note:
*1RE: polyethylene MI = 20, d = 0.922
*2EVC1: C2H4-vinyl acetate-CO copolymer MI = 30, VAc = 30% (wt.), CO = 12% (wt.)
*3Talc: particle size 10μ (average)
*4CaC O3: calcium carbonate, 5μ (average)
*5EVC2: C2H4-VAc-CO copolymer MI = 0.5, VAc = 23% (wt.), CO = 2% (wt.)
*6EVA: ethylene-VAc copolymer MI = 20, VAc = 33% (wt.)

What we claim is:

1. A granular chemical fertilizer with a degradative coating comprising as its combination of active ingredients
    (a) a polyolefin resin and
    (b) an ethylene-vinyl acetate-carbon monoxide copolymer,
said polyolefin resin being selected from the group consisting of:
    (1) polyethylene,
    (2) polypropylene,
    (3) polybutene-1, and
    (4) copolymers of at least two members selected from the group consisting of ethylene, propylene and butene-1,
the ratio by weight of said ethylene-vinyl acetate-carbon monoxide copolymer to said polyolefin resin being in the range of 0.1 to 1.8.

2. A granular chemical fertilizer according to claim 1 wherein said coating further includes a water-difficulty-soluble or water-insoluble filler mixed therein.

3. A granular chemical fertilizer according to claim 2 wherein said filler is at least one member selected from the group consisting of talc, clay, diatomaceous earth, silica, metal silicates, calcium carbonate, sulfur, metal oxides and starch, each in powder form.

4. A granular chemical fertilizer according to claim 1 wherein said polyolefin resin is polyethylene.

5. A granular chemical fertilizer according to claim 4 wherein said ethylene-vinyl acetate-carbon monoxide copolymer contains 30% by weight of vinyl acetate, 12% carbon monoxide and 58% ethylene and has a melt index of 30.

6. A granular chemical fertilizer according to claim 4 wherein said ethylene-vinyl acetate-carbon monoxide copolymer contains 23% by weight of vinyl acetate 2% by weight of carbon monoxide and 75% by weight of ethylene and has a melt index of 0.5.

7. A granular chemical fertilizer according to claim 1 wherein said polyolefin resin is polypropylene.

8. A granular chemical fertilizer according to claim 1 wherein said polyolefin resin is polybutene-1.

9. A granular chemical fertilizer according to claim 1 wherein said polyolefin resin is a copolymer of at least two members selected from the group consisting of ethylene, propylene and butene-1.

10. A granular chemical fertilizer with a degradative coating comprising as its active ingredients (A) a polyolefin resin selected from the group consisting of
(1) polyethylene,
(2) polypropylene,
(3) polybutene-1, and
(4) copolymers of at least two members selected from the group consisting of ethylene, propylene and butene-1, and (B) an ethylene-vinyl acetate-carbon monoxide copolymer having 5-50% by weight of vinyl acetate, 0.1-15% by weight of carbon monoxide and 35-94.9% by weight of ethylene, and the ratio by weight of said ethylene-vinyl acetate-carbon monoxide copolymer to said polyolefin resin being in the range of 0.1 to 1.8.

11. A granular chemical fertilizer according to claim 10 wherein said coating further includes a water-difficultly-soluble or water-insoluble filler mixed therein.

12. A granular chemical fertilizer according to claim 11 wherein said filler is at least one member selected from the group consisting of talc, clay, diatomaceous earth, silica, metal silicates, calcium carbonate, sulfur, metal oxides and starch, each in powder form.

13. A granular chemical fertilizer according to claim 10 wherein the copolymer of (B)(2) is composed of 30% by weight of vinyl acetate and 12% by weight of carbon monoxide.

14. A granular chemical fertilizer according to claim 10 wherein the copolymer of (B) is composed of 23% by weight of vinyl acetate and 2% by weight of carbon monoxide.

15. A granular chemical fertilizer according to claim 10 wherein said polyolefin resin is polyethylene.

16. A granular chemical fertilizer according to claim 15 wherein said ethylene-vinyl acetate-carbon monoxide copolymer contains 30% by weight of vinyl acetate, 12% carbon monoxide and 58% ethylene and has a melt index of 30.

17. A granular chemical fertilizer according to claim 15 wherein said ethylene-vinyl acetate-carbon monoxide copolymer contains 23% by weight of vinyl acetate, 2% by weight of carbon monoxide and 75% by weight of ethylene and has a melt index of 0.5.

18. A granular chemical fertilizer according to claim 10 wherein said polyolefin resin is polypropylene.

19. A granular chemical fertilizer according to claim 10 wherein said polyolefin resin is polybutene-1.

20. A granular chemical fertilizer according to claim 10 wherein said polyolefin resin is a copolymer of at least two members selected from the group consisting of ethylene, propylene and butene-1.

* * * * *